(12) United States Patent
Radimirsch et al.

(10) Patent No.: US 6,212,202 B1
(45) Date of Patent: Apr. 3, 2001

(54) METHOD AND APPARATUS FOR TRANSMITTING DATA WHILE USING BOTH AN ATM BROADBAND CHANNEL AND A NARROW-BAND CHANNEL

(75) Inventors: Markus Radimirsch, Laatzen; Gerhard Fettweis, Dresden; Joerg Kuehne, Dresden; Branimir Stantchev, Dresden, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 08/934,284

(22) Filed: Sep. 19, 1997

(30) Foreign Application Priority Data

Sep. 20, 1996 (DE) ................................. 196 38 814

(51) Int. Cl.[7] ................. H04J 3/24; H04Q 7/00
(52) U.S. Cl. .............. 370/473; 370/329; 370/395; 455/451
(58) Field of Search .................. 370/349, 329, 370/524, 465, 395, 473, 474, 328, 468, 330, 341, 282, 334, 336; 455/451, 450, 422, 434–5

(56) References Cited

U.S. PATENT DOCUMENTS

| | | | |
|---|---|---|---|
| 5,276,686 | * 1/1994 | Ito | 370/330 |
| 5,299,228 | * 3/1994 | Hall | 370/335 |
| 5,570,352 | * 10/1996 | Poyhonen | 370/330 |
| 5,600,633 | * 2/1997 | Jaisingh et al. | 370/277 |
| 5,661,723 | * 8/1997 | Ueno et al. | 370/315 |
| 5,734,645 | * 3/1998 | Raith et al. | 370/329 |
| 5,758,090 | * 5/1998 | Doner | 709/236 |
| 5,793,744 | * 8/1998 | Kanerva et al. | 370/209 |
| 5,859,879 | * 1/1999 | Bolgiano et al. | 375/347 |
| 5,881,061 | * 3/1999 | Iizuka et al. | 370/337 |
| 5,901,143 | * 5/1999 | Rotter et al. | 370/329 |
| 5,956,329 | * 9/1999 | Pernice et al. | 370/336 |

OTHER PUBLICATIONS

Funkschau, Jul. 1995, p. 40 cited in specification.

Funkschau, Nov. 1996, pp. 40 ff. cited in specification.

* cited by examiner

*Primary Examiner*—David R. Vincent
(74) *Attorney, Agent, or Firm*—Kenyon & Kenyon

(57) ABSTRACT

A broadband data transmission method in a wireless cellular network, the data to be transmitted being transmitted as packet-oriented data, preferably by means of ATM cells. An additional narrow-band signaling channel transmits signaling information necessary for managing the cellular, wireless network.

18 Claims, 4 Drawing Sheets

METHOD AND APPARATUS FOR TRANSMITTING DATA WHILE USING BOTH AN ATM BROADBAND CHANNEL AND A NARROW-BAND CHANNEL

FIELD OF THE INVENTION

The present invention relates to a method for the wireless transmission of digital data, as well as to a telecommunication system.

A method for the wireless transmission of digital data, such as the "DECT" method, as described for example in Funkschau, issue November 1996, pp. 40 ff. This method is used when a stationary transceiver unit having a plurality of mobile transceiver units is supposed to maintain a seemingly simultaneous connection for the wireless transmission of data. For this, a specified time interval is subdivided, for example, into 24 time slots. The first 12 time slots provide for emitting data from the stationary transceiver unit, the second 12 time slots being provided for receiving data through the stationary transceiver. Each mobile transceiver unit is assigned one time slot from the first 12 time slots and one time slot from the second 12 time slots, so that a time-multiplexing method is realized. The same bandwidth and the same transmission time are provided for each possible connection, which thus results in a fixed transmission rate.

Furthermore, for the wire-conducted transmission of digital payload, the asynchronous transfer mode (ATM) method is known, as disclosed, for example, in the periodical Funkschau, issue July 1995, p. 40. Useful data, which originate from a data transmitter and are intended for a data receiver, are divided up into packets of 48 byte lengths and with headers of 5 byte lengths. The header contains information about the data transmitter and the data receiver, as well as information needed for routing the packets to the data receiver. The combination of packet and header is also referred to as a cell. A cell is transmitted over a line when transmission line capacity is available. Thus, the available bandwidth is able to be flexibly distributed among individual network subscribers.

In contrast to other packet-oriented data transmission methods, as known, e.g., from computer technology, the cell length is fixed and a continuous data stream flows on the communication paths, the data stream being filled with void cells when there are not sufficient data to be transmitted. Before a data transmission begins, a favorable path, which can have available capacity, is defined, on which all cells are then transported in that they replace void cells. This eliminates the need for transmitted packets and information to undergo error correction when correctly combining the cells into payload contents at the receiver, as is known from an ethernet.

SUMMARY OF THE INVENTION

One of the advantages of the present invention is that by using a separate, narrow-band signaling channel, a type of modulation can be selected that is insensitive to the Doppler shift of the carrier frequency because of the movement of a transceiver unit.

In addition, data can also be transmitted on a second radio frequency channel to enable an effective power-saving mode for at least one of the transceiver units. It is further beneficial, for example, to design the first radio channel as a broadband channel and the second radio-frequency channel as a narrow-band channel, since by this means the broadband is optimally adapted to the data-transmission rates to be expected.

Furthermore, it is advantageous for the transmitted packets with their headers to be configured as ATM cells, since this eliminates the need for converting the data structure in the line/radio interface, thus improving the data-transmission rate.

In addition, one of the advantages of the telecommunication system of the present invention is that it combines the capability to flexibly adapt the transmission rate with the spatial mobility of the transceiver units. Such a combination renders possible new services, e.g., multimedia services, for mobile transceiver units. Thus, it is especially advantageous to design the first radio channel as a broadband channel that is capable of transmitting the payload contents, thus making it possible to attain a high transmission rate, whereas a narrow-band second radio channel suffices for managing the wireless transmission.

It is advantageous for one of the transceiver units to be conceived as a stationary unit and to be provided with a connection for a line-conducted transmission, since this enables the telecommunication system to be interfaced with a line-conducted, broadband network, preferably an ATM network.

DETAILED DESCRIPTION OF THE INVENTION

Figure 1:
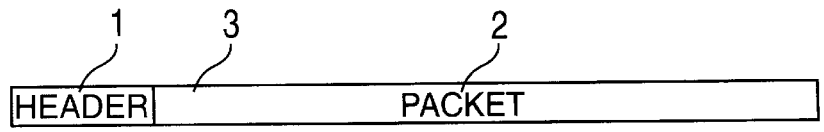
FIG. 1 shows an ATM cell.

FIG. 1 illustrates a cell 3. The cell 3 includes a packet 2 and a header 1.

Cell 3 in FIG. 1 is an example of an informational unit for a packet-supported method for transmitting data. In the exemplary embodiment selected here, cell 3 is an ATM cell, where packet 2 has 48 bytes of payload contents and the header has 5 bytes of information relevant to the transmission.

Figure 2:
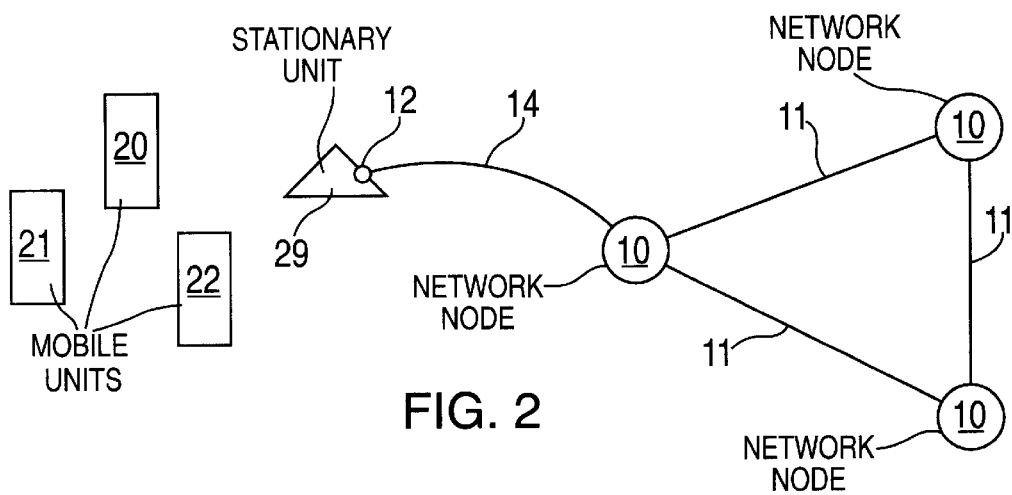
FIG. 2 shows a telecommunication system according to an embodiment of the present invention.

FIG. 2 depicts a broadband network in which ATM cells are able to be transmitted. The transmission network is comprised of three network nodes 10, which are linked via power lines 11. In addition, a stationary unit 29 is shown, which is provided with a connection 12. Stationary unit 29 is linked via connection 12 and a power connection line main feeder 14 to one of the network nodes 10. Also shown are a mobile unit 20, a second mobile unit 21, and a third mobile unit 22.

Mobile units 20, 21, and 22 are conceived as transceiver units, which are in radio communication with stationary unit 29. On the one hand, stationary unit 29 comprises a transceiver unit capable of establishing radio contact with mobile units 20, 21, and 22; on the other hand, it also is provided with a connection 12 allowing it to make a line-conducted contact with network node 10.

Figure 3:
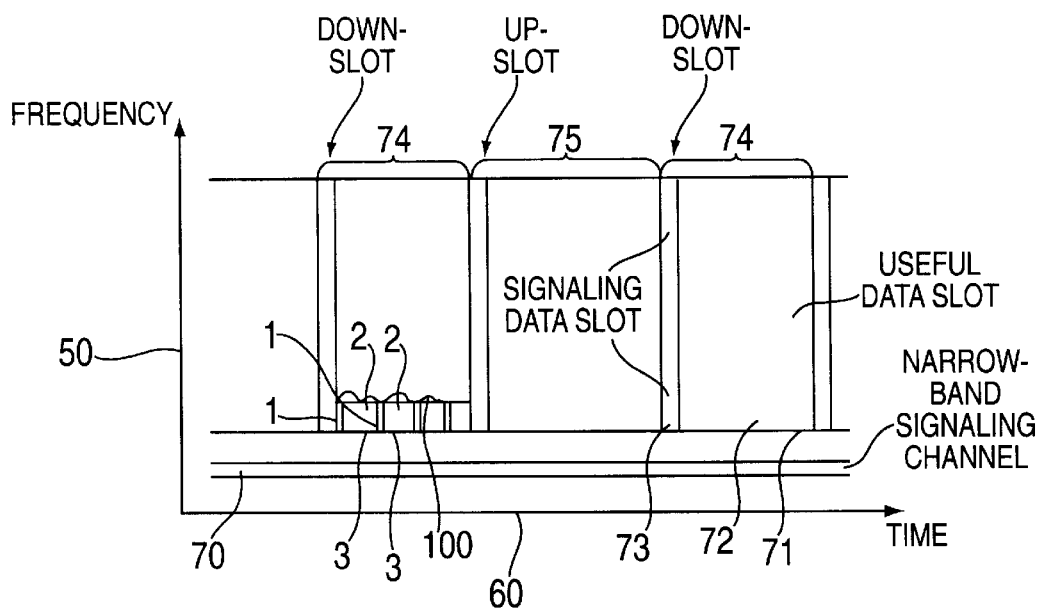
FIG. 3 shows an exemplary partitioning of a frequency band in accordance with the present invention.

FIG. 3 illustrates the frequency- and time-division of a radio frequency band, as can be used for transmitting data between mobile units 20, 21, 22 and stationary unit 29 of FIG. 2. In this case, frequency axis 50 is plotted as a vertical axis, time axis 60 as a horizontal axis. The radio communication ensues, on the one hand, via a broadband channel 71, on the other hand, via a narrow-band signaling channel 70, which is configured at a lower frequency. Broadband channel 71 is comprised of an alternating arrangement of a payload slot 72 and of a signal-data slot 73. In the exemplary embodiment selected here, payload slot 72 takes up the very much larger time slot. Four ATM cells 3 are indicated in one of payload slots 72. Each ATM cell 3, in turn, is comprised of one header 1 and one packet 2. Cells 3 are arranged to follow one another chronologically, each cell using the entire usable frequency band at a specific time. For the sake of clarity, cells 3 in FIG. 3 do not extend over the entire frequency range; the purpose of wavy line 100 is to simplify the representation.

The method according to the present invention will now be elucidated on the basis of FIGS. 1 through 3. First, an exact logical and physical division of the radio channels in FIG. 3 will be described. In narrow-band signaling channel 70, stationary unit 29 sends out its identifier. Broadband channel 71 is comprised of an alternating sequence of payload slots 72 and signaling data slots 73, it being necessary in the exemplary embodiment selected here to make a further distinction.

In a first pair comprised of signaling data slot 73 and useful data slot 72, which is denoted in FIG. 3 by reference numeral 74, data are emitted by stationary unit 29. The segment of broadband channel 71, which is filled by stationary unit 29, is referred to in the following as down-slot 74. In signaling data slot 73 of down-slot 74, stationary unit 29 emits data, which are used for managing the wireless transmission. Numbered among these data are, for example, the allocation of transmission time to mobile units 20, 21, and 22. The significance of this allocation will be discussed in greater detail in the next section. Useful data slot 72 of down-slot 74 is comprised of a sequence of ATM cells 3. Each of these ATM cells can originate from another data transmitter and be intended for another data receiver. This information is defined in header 1 of any one cell 3.

What all cells 3 have in common is that during the down-slot 74, they are sent out by stationary unit 29 and are able to be received by mobile units 20, 21, and 22. It should be noted, in this context, that the data transmitter does not necessarily have to be stationary unit 29. It is conceivable, for example, that the data transmitter is a network node 10 that is going to send a message comprised of an ATM cell into mobile unit 21. This ATM cell is transmitted via power connection line 14 to stationary unit 29, and then sent out as an ATM cell in the stream of ATM cells in down-slot 74. In the header of the just discussed ATM cell would be noted: network node 10 as a data transmitter and mobile unit 21 as a data receiver.

Down-slot 74 is followed by up-slot 75, which is likewise comprised of a signaling data slot 73 and a payload slot 72. Signaling data slot 73 of up-slot 75 makes available the transmission capacity of the message from mobile units 20, 21, and 22 to stationary unit 29, which relates to managing the radio communication between the mobile units and the stationary unit. Examples of such messages are, for example, the check-in requests, request to communicate or request to send. A check-in request is understood to be a brief signaling on the part of mobile unit 20, 21, 22, which is located within the transmitting and receiving range of stationary unit 29. A request to send signifies the message of wanting to transmit a data record having a defined length and a defined priority level to stationary unit 29. A request to communicate includes the request of establishing a bidirectional radio communication between a mobile unit and the stationary unit at a specific transmission rate.

Signaling data slot 73 of up-slot 75 is followed by payload slot 72. This, in turn, is comprised of a sequence of ATM cells 3, which are not shown in detail in FIG. 3. Each cell 3, in turn, can originate from a different data transmitter and be intended for a different data receiver. It should be emphasized, however, that the stream of cells 3 does not have to be continuous in up-slot 75. Thus, it is conceivable, for example, that a few cells are missing, and these gaps, which would be filled in a wire-conducted ATM network with "IDLE" cells, can be filled in the up-slot by general transmission pauses of a precisely defined length. This is especially beneficial when the intention is for mobile units 20, 21, and 22 to have an efficient power-saving mechanism. What all cells 3 in payload slot 72 of up-slot 75 have in common is that they were sent out by one of mobile units 20, 21, and 22. The exact instant when a specific mobile unit may send out cells within up-slot 75 is stipulated by stationary unit 29 and communicated in the exemplary embodiment selected here in signaling data slot 73 of down-slot 74.

At the same time, stationary unit 29 sends out its station identifier on narrow-band signaling channel 70. This division renders possible an efficient power-saving mode. As an example, after a certain time of no active participation in a data transmission, mobile units 20, 21, and 22 can lapse into a power-saving mode, in which the transmit and receive functionality is switched off for broadband channel 71. However, the mobile unit can continue to assure, by receiving narrow-band signaling channel 70, that it is still within the transmitting range of stationary unit 29. Moreover, the ready-to-transmit and ready-to-receive state of the mobile unit can be re-established by way of narrow-band signaling channel 70.

Figure 4:
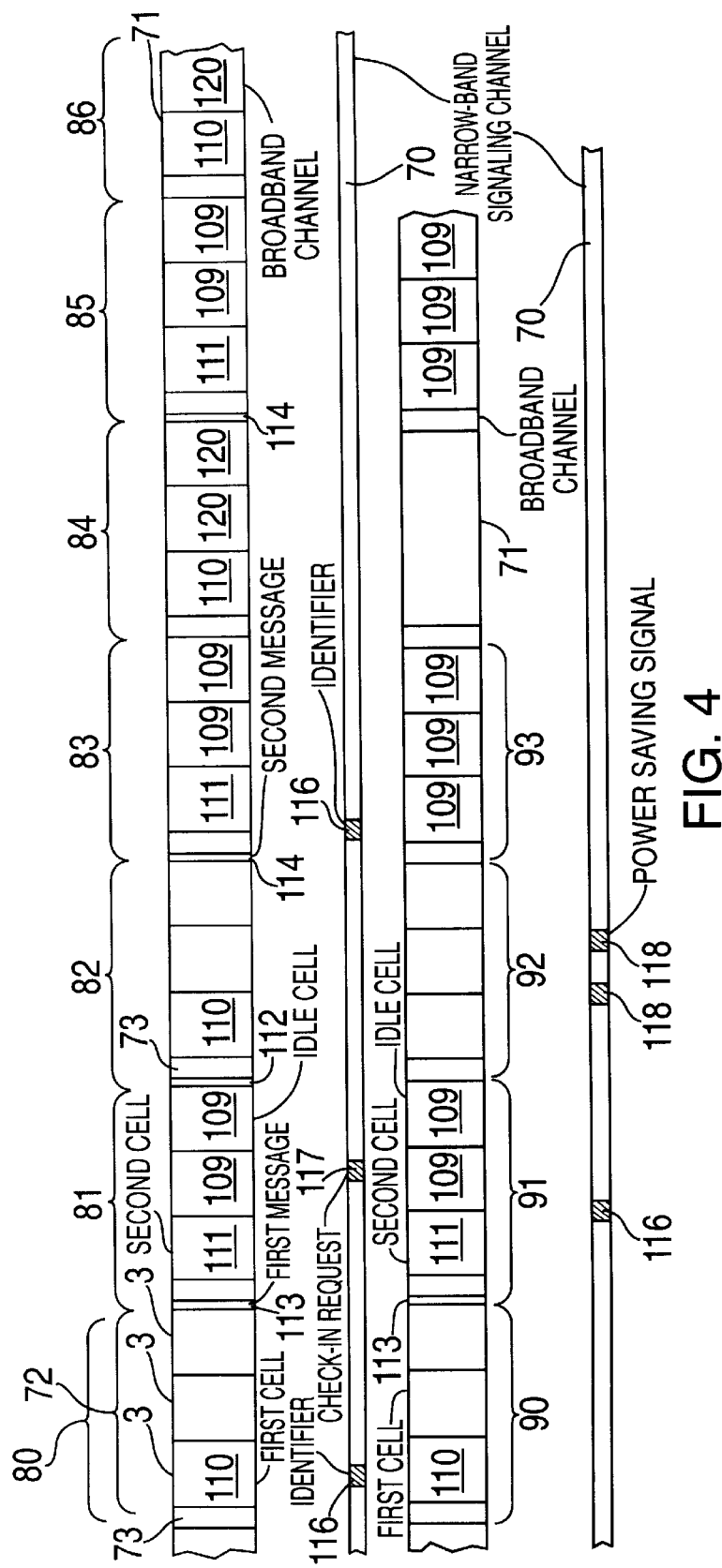
FIG. 4 shows a cell stream according to an embodiment of the present invention.

FIG. 4 shows by way of example the cell stream that is created when mobile unit 20 maintains a connection with stationary unit 29, the connection having a low transmission rate. During this data transmission, mobile unit 21 is activated and checks in. Second mobile unit 21 then sends off a data file as a high priority and then lapses into a power-saving mode.

FIG. 4 illustrates a broadband channel 71 and a narrow-band signaling channel 70, in which the above-described data transmission flows take place. As already shown in FIG. 3, down-slots 74 alternate with up-slots 75. Both down-slot 74 as well as up-slot 75 have a signaling data slot 73, which is followed by a useful data slot 72. Useful data slot 72, in turn, comprises three cells 3 in the example shown here. However, it is also conceivable that up-slot 75 and down-slot 74 contain a different number of cells; likewise it is also conceivable and provided for more cells 3, for example 10 to 70, to be combined in one payload slot 72. The small number of cells 3 per payload slot 72 was selected to simplify the illustration in FIG. 4.

Individual cells have different designations, depending on their contents. First cell 110 contains messages sent out by mobile unit 20. Second cell 111 contains messages sent out by stationary unit 29. Third cell 109 is an IDLE cell. Fourth cell 120 contains messages from mobile unit 21. Furthermore, messages are transmitted in the signaling slots. A first message 113 is sent out by stationary unit 29 and has as contents: "first cell for mobile unit 20". A second message 114 has as contents, for example: "first cell mobile unit 20, second cell mobile unit 21, third cell mobile unit 22." A third message 112, which is sent out by mobile unit 21, has as contents, for example: "request to send by mobile unit 21, urgent, four cells." On narrow-band signaling channel 70, there are two messages, identifier 116 sent out by stationary unit 29 and check-in request 117 sent out by mobile unit 21, as well as power-saving signal 118.

In the data stream shown in FIG. 4, a first up-slot 80 is first considered on broadband channel 71. No messages whatsoever are dispatched in its signaling data slot 73. Payload slot 72 is comprised of a first cell 110, which was sent out by mobile unit 20, followed by a transmission pause that continues for two cell lengths. On the narrow-band signaling channel, the stationary unit dispatches an identifier 116. This dispatching of identifier 116 is periodically repeated as the process continues. A first down-slot 81 follows, whose signaling data slot contains first message 113 dispatched by stationary unit 29. This message allocates to mobile unit 20 the first cell in the next up-slot, in third up-slot 84. In second down-slot 83, the payload slot is comprised of a second cell 111, which is dispatched by stationary unit 29 and is intended for mobile unit 20, followed by two IDLE cells 109. During the same time, more or less during the dispatching of second cell ill, the mobile unit was switched on. During the dispatching of the IDLE cells, it now sends out check-in request 117, which is received by stationary unit 29.

In third up-slot 84 that follows at this point, a third message 112 is sent out in signaling data slot 73 by second mobile unit 21, in which second mobile unit 21 announces its intention to transmit an urgent message. The useful data that follow contain, in turn, a first cell, which was sent out by mobile unit 20, followed by a transmission pause that continues for two cell lengths. In the following third down-slot 85, the signaling data slot contains a second message 114, which allocates to mobile unit 20 and to second mobile unit 21 defined instants for sending out their cells. This is followed, in turn, by a second cell 111, which is intended for mobile unit 20, as well as two IDLE cells 109. In the following third up-slot 84, no signaling data are sent out by the mobile units. The useful data slot contains a first cell, which had been sent out by mobile unit 21, as well as two fourth cells 120, which were sent out by mobile unit 21.

Third down-slot 85 and fourth up-slot 86 represent a repetition of slots 83 and 84, which can continue for so long until either additional messages have to be transmitted or a message transmission is ended. Fifth up-slot 90 corresponds, in turn, to first up-slot 80, the data transmission from the second mobile unit 21 having been broken off in the meantime. In the same way, fifth down-slot 91 corresponds to first down-slot 81. At this point, the data transmission is ended, no cells are transmitted in the next up-slot 92; in next down-slot 93, exclusively IDLE cells 109 are transmitted.

Since no further data transmission takes place, mobile units 20, 21 can lapse into a power-saving mode. To report this to stationary unit 29, mobile units 20, 21 each emit a power-saving signal 118, which is received by the stationary unit. In this power-saving mode, the transmit and receive functionality for broadband signal 71 is switched off, not, however for narrow-band signaling channel 70. Thus, mobile units 20, 21, 22 can continue to receive the station identifier of stationary unit 29 and, thus, assure that they are still within the transmission range of said stationary unit.

Provision can also be made for the mobile units to be called back into the normal mode by a prompting signal sent out by the stationary unit on the narrow-band signaling channel during the power-saving mode, for example, in order to establish a connection or to receive incoming data on the broadband channel.

Figure 5:
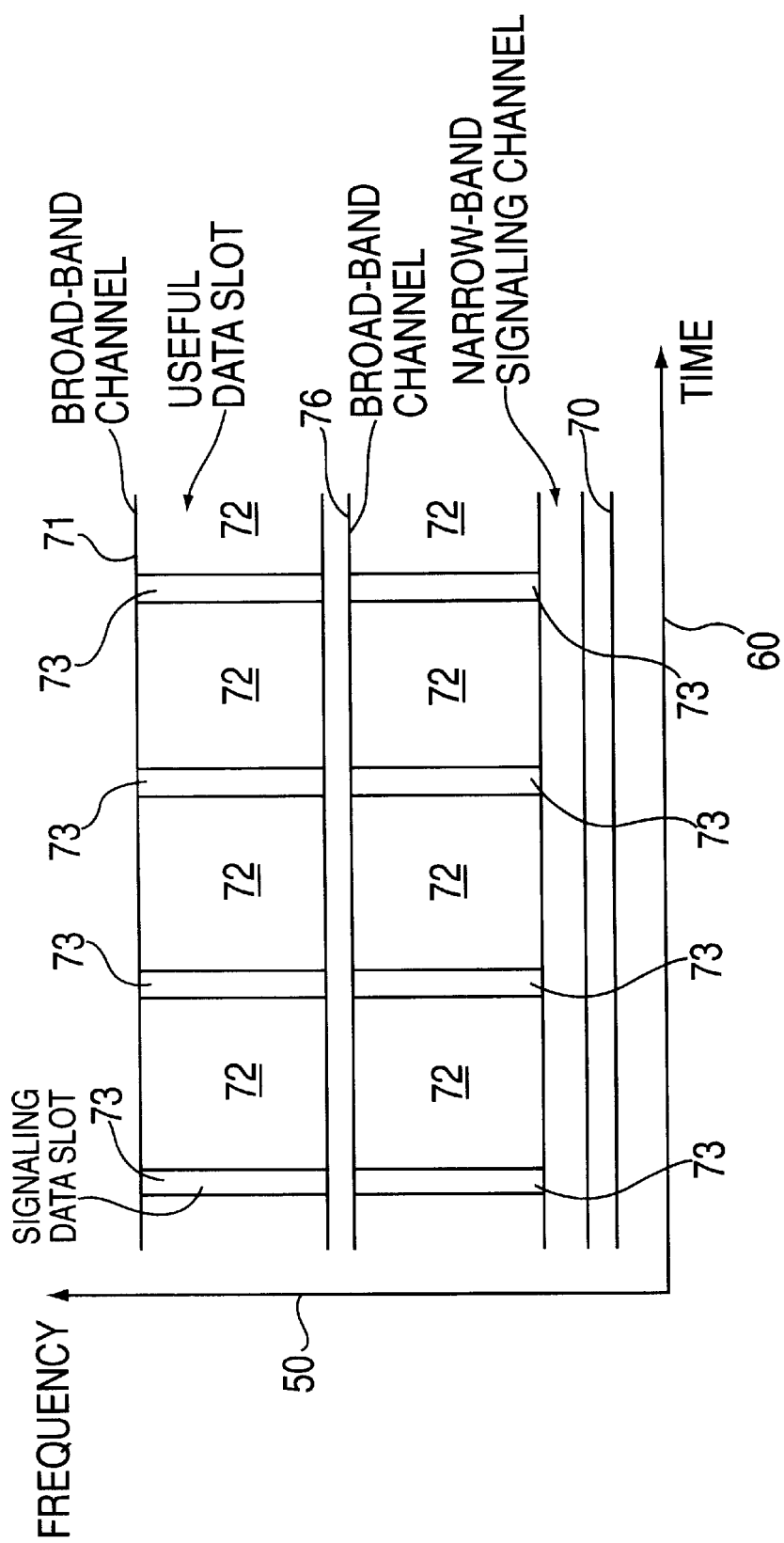
FIG. 5 shows a second partitioning of the frequency band in accordance with an embodiment of the present invention.

FIG. 5 depicts another exemplary embodiment of the present invention. A second channel diagram is shown, plotted in the same way as in FIG. 3, with a time axis 60 and a frequency axis 50. There are, in turn, a narrow-band signaling channel 70 and a broadband channel 71. Additionally, however, a second broadband channel 76 is provided. Broadband channel 71 and second broadband channel 76 are both subdivided into useful data slots 72 and signaling data slots 73, signaling data slot 73, in turn, being of a clearly shorter time duration than useful data slot 72.

The utilization of the channel diagram shown in FIG. 5 is such that signaling data are exchanged, in turn, on narrow-band signaling channel 70, and both signaling data as well as useful data are exchanged on broadband channel 71 and second broadband channel 76. Now available all the time, for example, to broadband channel 71 is the dispatching of information from stationary unit 29; data which are supposed to be sent out by mobile units 20, 21, and 22 are sent out on the second broadband channel 76. The signaling functions as well as their allocation to the narrow-band signaling channel, and to the broadband signaling channels 71, 76 do not differ from the exemplary embodiment of the present invention discussed in conjunction with FIG. 3.

The exemplary embodiments according to the present invention portrayed in FIG. 3 and FIG. 5 differ by the manner of multiplexing of their up and down signals. For this, time multiplexing was selected in FIG. 3, whereas frequency multiplexing was selected in FIG. 5. However, it is also conceivable and provided for signaling information to be transmitted in both directions on narrow-band signaling channel 70. For example, a request-to-send signal, which had been transmitted in the preceding examples on the broadband channel, could also be transmitted on narrow-band signaling channel 70. If narrow-band signaling channel 70 is a channel for the bidirectional transmission of data, then the possibility likewise exists, in turn, to either use a time-multiplexing method, narrow-band signaling channel 70 still being subdivided into slots, or to revert to a frequency-multiplexing method, narrow-band signaling channel 70 then being divided up into two narrow-band signaling channels.

Provision is likewise made for a narrow-band signaling channel 70 to be configured without multiplexing, but for bidirectional transmission. This can be implemented, for example, in that messages can be simply transmitted on the narrow-band signaling channel, as needed. When working with this method, message collisions are unavoidable, however, the integrity of a message transmission is subsequently checked. This method is comparable to a method for transmitting data between computers, i.e., on an ethernet. The fact that this method is less efficient and results in a smaller bandwidth has to be considered in view of the comparatively lower costs for additional circuitry. However, this accessing method is not suitable for broadband channels 71 and 76, since it works against the aim of specifying a broadband, wireless transmission method.

Other possibilities for slightly altering the present invention follow from another arrangement of the channels in the frequency domain. Thus, departing from the channel diagram indicated in FIGS. 3 and 5, it is quite possible and also provided for the frequency domain to be filled up, without any gaps, with one or more broadband channels and one or more narrow-band signaling channels. It is likewise possible and also provided for the frequencies of the narrow-band signaling channels and of the broadband channels to be exchanged with one another, thus, for example, for a narrow-band signaling channel to be arranged between two broadband channels, or even to have a higher frequency than the broadband channels.

Finally, other ways of slightly altering the present invention entail allotting the signaling functions to signaling data slots in the broadband channels and to the narrow-band signaling channels. For example, the mobile unit's request to check-in or to log on for the first time to a stationary unit can be carried out on a narrow-band signaling channel.

Another slight alteration of the method according to the present invention entails not providing any stationary unit 29. In such a case, it is, rather, a mobile unit, e.g. mobile unit 20, which assumes the tasks of stationary unit 29. Mobile unit 20 allocates the channels in the up-channel or in the up-slot to the other mobile units. At the same time, it maintains a connection, preferably a wireless connection to a network node 10. Messages to be dispatched from network node 10, for example, to mobile unit 21 are, thus, first sent to mobile unit 20, which then retransmits them in a down-slot or in the down-channel to mobile unit 21.

Figure 6:
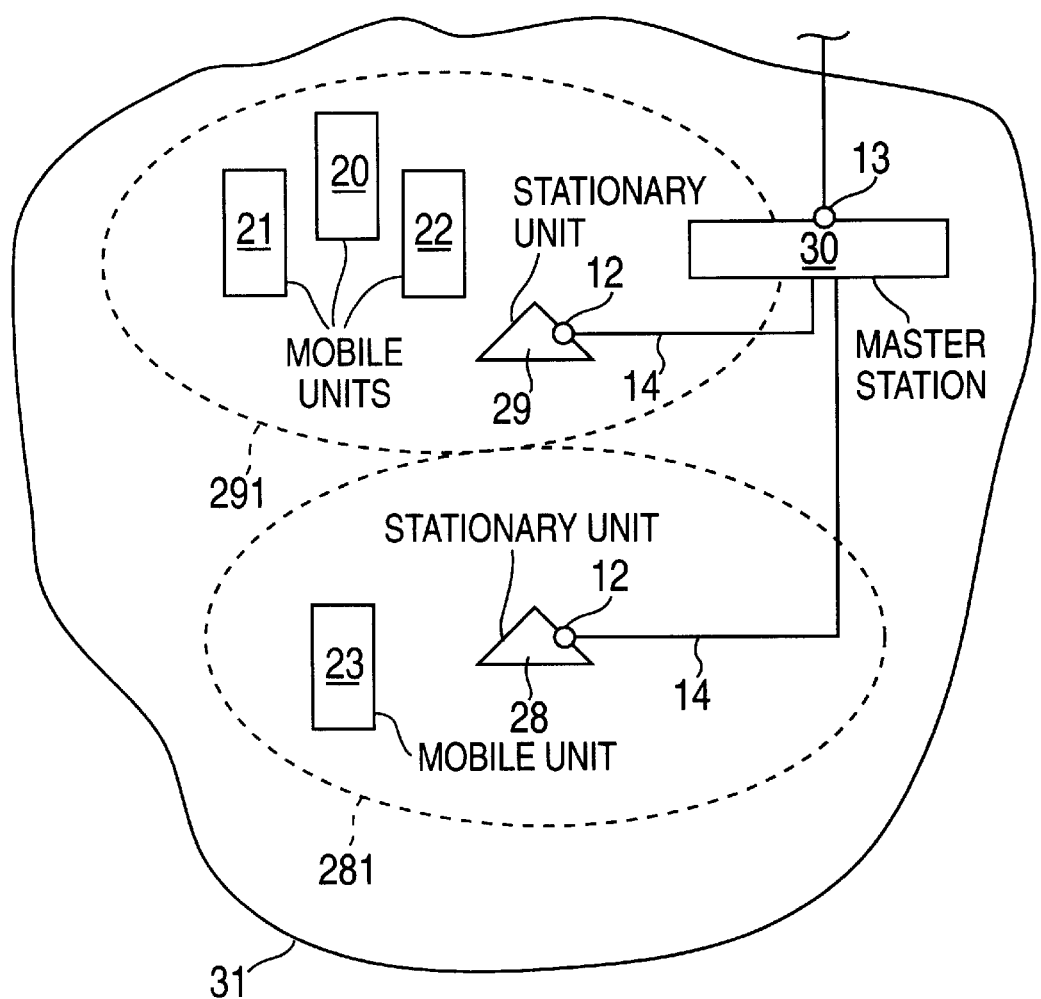
FIG. 6 shows a second telecommunication system according to an embodiment of the present invention.

FIG. 6 depicts a telecommunication system 31 according to the present invention. Telecommunication system 31 has a master station 30 with a central connection 13 that enables the master station to communicate with other network nodes 10 that are not shown in FIG. 6. Master station 30 is linked via two power connection lines 14 to a stationary unit 29 and a second stationary unit 28. For this purpose, the stationary units have a connection 12. Stationary unit 29 and second stationary unit 28 function in the same way as stationary unit 29 in FIG. 2. The radio range of stationary unit 29 is defined by a first radio cell 291, which is illustrated as a dotted-line oval in FIG. 6. In the same way, the radio range of the second stationary unit 28 is defined by a second radio cell 281. Situated in first radio cell 291 are mobile unit 20, second mobile unit 21, and third mobile unit 22; situated in second radio cell 281 is fourth mobile unit 23.

Telecommunication system 31 is a "cellular" system, which functions in an already known way, for example as a GSM network. A stationary unit handles the transmission between master station 30 and mobile units 20, 21, 22, and 23. In each case, the stationary unit selected is the one best able to established radio contact with the mobile unit. When a mobile unit makes the transition from one radio cell into another radio cell, the communication path must be changed. This process is usually referred to as a handover.

For the handover, it is beneficial to tap the signaling operations of the stationary units on narrow-band signaling channel 70. Thus, even in the power-saving mode, mobile units 20, 21, 22, and 23 are able to detect when the transmit and receive functionality has been switched off on the broadband channel, to determine whether it would be advantageous to receive via a different base station, and to initiate a handover via the narrow-band signaling channel. It is likewise advantageous that one of mobile units 20, 21, 22, and 23 checks in when making a reentry into a radio cell or when the unit is switched on, i.e., dispatches a sign-on ready signal to the next stationary unit. It is likewise beneficial for this check-in request to be made on narrow-band signaling channel 70, since it can then be carried out in the power-saving mode.

It should not be of fundamental importance to the present invention which of the signaling functions, in particular, are transferred to narrow-band signaling channel 70, and which of the signaling functions are transmitted in a signaling slot within the broadband channel. It is to be considered, however, that time-critical data are advantageously transmitted on the broadband channel. Check-in request and base identification are advantageously transmitted on the narrow-band signaling channel in order to realize a power-saving mode and a simple handover.

As a general principle, the following signaling data are able to be transferred to narrow-band signaling channel 70:
1. Identification of the stationary unit;
2. Announcement by the stationary unit of its intention to newly connect to a mobile unit;
3. Announcement of data for an existing connection to a mobile unit, there not being any data to be transmitted for a while;
4. A mobile unit's intention to execute a handover;
5. Handover wish of a mobile unit;
6. Request to send or request to communicate, in particular when the mobile unit is awakened from the power-saving mode; and
7. Synchronization information.

It is likewise provided to configure up-slot 75 and down-slot 74 with a variable length, the length being a function of the volume of data to be transmitted. In particular, it is possible to provide a signaling data slot in the down-slot only when signaling data are also actually to be transmitted by the stationary unit to the mobile unit. In this case, it is advantageous to announce the dispatching of a signaling slot on the narrow-band signaling channel.

Provision is also made for only the down-slot to have a signaling slot. Besides the narrow-band signaling channel, two broadband paths are then open for data to be signaled from a mobile unit to the stationary unit:
1. The sending of a regular ATM cell, the data receiver being the stationary unit and the 48 bytes of payload being the signaling information to be transmitted; and
2. The sending on a "random-access" channel.

The random-access channel is comprised of at least one cell in the up-slot, which is not allocated to any specific mobile unit. Each mobile unit can send in this time (thus, this random-access channel resembles the signaling slot in the up-slot, as described above). For this reason, the integrity of the transmission is also to be checked by the mobile unit. A mobile unit can request cells in the next up-slot on the random-access channel, to then transmit the actual signaling information in said cells. The number of random-access channels can vary from up-slot to up-slot, and can be stipulated, for example, by the stationary unit, as needed. An especially rational utilization of the bandwidth is achieved with this procedure.

Finally, it is also provided to use the narrow-band signaling channel for transmitting payload for extremely low-rate services. It is possible, for example, to draw upon unused capacity in the narrow-band signaling channel for transmitting data in a simple paging system.

What is claimed is:

1. A method for the wireless transmission of a digital payload between at least two transceiver units, the digital payload originating from a data transmitter and being sent to a data receiver, the method comprising the steps of:

forming the digital payload into at least one ATM cell, the at least one cell having a packet having a predefined length and a header identifying the data transmitter and the data receiver;

providing at least one broadband first radio channel which occupies a frequency band for transmitting the at least one cell;

providing at least one narrow-band radio channel which occupies a different frequency band for communicating first data for use in establishing another communication between the at least two transceiver units; and transmitting the at least one cell between the at least two transceiver units via a wireless communication link, wherein the at least one broadband radio channel and the at least one narrow-band radio channel are associated with the wireless communication link;

wherein the at least one broadband radio channel includes payload slots and signaling data slots, the signaling data slots being used for communicating second data between the at least two transceiver units, the another communication being based on the first data and the second data.

2. A method for the wireless transmission of a digital payload between at least two transceiver units, the digital payload originating from a data transmitter and being sent to a data receiver, the method comprising the steps of:

forming the digital payload into at least one ATM cell including a packet having a predefined length and a header identifying the data transmitter and the data receiver;

providing at least one broadband radio channel, for transmitting the digital payload;

providing at least one narrow-band radio channel, for transmitting first data for use in establishing another communication between the at least two transceiver units; and transmitting the digital payload between the at least two transceiver units via a wireless communication link, wherein the at least one broadband radio channel and the at least one narrow-band radio channel are associated with the wireless communication link;

wherein the broadband radio channel is divided into payload slots and signaling data slots, the signaling data slots being utilized for transmitting second data between the at least two transceiver units, the another communication being a function of the first data and the second data.

3. A method for the wireless transmission of a digital payload between at least two transceiver units, the digital payload originating from a data transmitter and being sent to a data receiver, the method comprising the steps of:

forming the digital payload into at least one ATM cell comprising a packet having a predefined length and a header identifying the data transmitter and the data receiver;

providing at least one broadband radio channel for transmitting the digital payload;

providing at least one narrow-band radio channel for transmitting first data for use in establishing another communication between the at least two transceiver units; and transmitting the digital payload between the at least two transceiver units via a wireless communication link, wherein the at least one broadband radio channel and the at least one narrow-band radio channel are associated with the wireless communication link;

wherein the broadband radio channel is divided into payload slots and signaling data slots, the signaling data slots being utilized for transmitting second data between the at least two transceiver units, the another communication a function of the first data and the second data.

4. The method according to claim 3, wherein the payload slots transmit high-bit-rate information and the narrow-band radio channel transmits low-bit-rate information, the high-bit-rate information and the low-bit-rate information being used for establishing the connection between the at least two transceiver units.

5. The method according to claim 4, wherein: the high-bit-rate information includes at least one of a sending request and a cell allocation; and the low-bit-rate information includes at least one of an identifier of a transceiver unit, a check-in request of the transceiver unit, a power-saving signal of the transceiver unit, and a request to reserve a portion of a payload slot.

6. The method according to claim 4, wherein the high-bit-rate information includes at least one of a sending request and a cell allocation.

7. The method according to claim 4, wherein the low-bit-rate information comprises at least one of an identifier of a transceiver unit, a check-in request of a transceiver unit, a power-saving signal of a transceiver unit, and a request to reserve a portion of a payload slot.

8. A telecommunication system, comprising:

a first transceiver unit;

a second transceiver unit coupled to the first transceiver unit via a wireless communication link;

wherein a digital payload is transmitted between the first transceiver unit and the second transceiver unit via the wireless communication link, the digital payload originating from a data transmitter and being sent to a data receiver, the digital payload being divided into ATM cells which are packets of a predefined length and a header which identifies the data transmitter and the data receiver;

wherein all packets are transmitted between the first and second transceiver units via a broadband radio channel, of the wireless communication link, a narrow-band radio channel, of the wireless communication link transmitting first data for establishing the another communication between the first and second transceiver units; and wherein the broadband radio channel includes payload slots and signaling data slots, the signaling data slots being used for communicating second data between the first and second transceiver units, the another communication being based on the first data and the second data.

9. The telecommunication system as defined by claim 8, wherein each packet and respective header is configured as an ATM cell.

10. The telecommunication system as defined by claim 8, wherein the first transceiver unit includes a mobile unit, and the second transceiver unit includes a stationary unit.

11. The telecommunication system as defined by claim 8, wherein an identifier is transmitted on the narrowband radio channel to one of the first transceiver unit and the second transceiver unit.

12. The telecommunication system as defined by claim 10, wherein the stationary unit includes a connection for a line-conducted transmission.

13. The telecommunication system as defined by claim 10, further comprising a master station coupled to the stationary unit, the stationary unit and the master station forming a cellular system.

14. The telecommunication system as defined by claim 10, wherein the stationary unit has a transmission range defining a radio cell, the mobile unit being able to change over from the radio cell to another radio cell, the change of radio cells being signaled on the narrow-band radio channel.

15. The telecommunication system as defined by claim 10, wherein the mobile unit is switched between one of an off state and on state, the change of states being signaled on the narrow-band radio channel.

16. The telecommunication system as defined by claim 10, wherein a transmit and receive functionality of the mobile unit is switched off for the broadband radio channel and the switch off procedure is signaled on the narrow-band radio channel.

17. The telecommunication system as defined by claim 13, wherein the master station includes a connection for a line-conducted transmission and the cellular system includes network nodes, wherein via the connection, a line-conducted transmission of packets to selected network nodes is provided.

18. The telecommunication system as defined by claim 17, wherein the line-conducted transmission of packets is provided in accordance with an Asynchronous Transfer Mode (ATM).

* * * * *

UNITED STATES PATENT AND TRADEMARK OFFICE
CERTIFICATE OF CORRECTION

PATENT NO.    : 6,212,202 B1
DATED         : April 3, 2001
INVENTOR(S)   : Markus Radimirsch et al.

It is certified that error appears in the above-identified patent and that said Letters Patent is hereby corrected as shown below:

<u>Column 5,</u>
Line 23, change "cell i11" to -- 111 --.

<u>Column 8,</u>
Line 63, delete "first".

Signed and Sealed this

Twentieth Day of August, 2002

Attest:

JAMES E. ROGAN
Attesting Officer      Director of the United States Patent and Trademark Office